United States Patent

Kageyama

[11] Patent Number: 5,847,033
[45] Date of Patent: Dec. 8, 1998

[54] ADHESIVE FOR BONDING RUBBER AND GLASS FIBER

[75] Inventor: Yuji Kageyama, Susono, Japan

[73] Assignee: Toyota Jidosha Kabushiki Kaisha, Toyota, Japan

[21] Appl. No.: 835,519

[22] Filed: Apr. 8, 1997

[30] Foreign Application Priority Data

Apr. 9, 1996 [JP] Japan ..................... 8-086714

[51] Int. Cl.⁶ .................................................. C08K 5/34
[52] U.S. Cl. ................................................ 524/86
[58] Field of Search ................................. 524/86

[56] References Cited

U.S. PATENT DOCUMENTS

| 4,401,713 | 8/1983 | Takata ..................... 428/290 |
| 4,963,613 | 10/1990 | Toyoda et al. ........... 524/594 |

FOREIGN PATENT DOCUMENTS 63-248879  10/1988  Japan .
4-41580    2/1992   Japan .
4-57839    2/1992   Japan .

*Primary Examiner*—Kriellion A. Sanders
*Attorney, Agent, or Firm*—Oblon, Spivak, McClelland, Maier & Neustadt, P.C.

[57] ABSTRACT

This invention provides an adhesive for bonding a rubber and a glass product, having excellent degradation resistance and high tackiness. This adhesive comprises (1) a hydrogenated nitrile-butadiene rubber latex, (2) a resorcin-formaldehyde resin and (3) an ethyleneurea compound expressed by the following general formula:

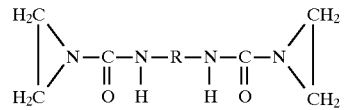

where R is a hydrocarbon group.

10 Claims, No Drawings

ADHESIVE FOR BONDING RUBBER AND GLASS FIBER

BACKGROUND OF THE INVENTION

1. Field of the Invention

This invention relates to an adhesive for bonding a glass fiber, which is used for reinforcing rubber products such as a timing belt, a rubber hose, etc., to the rubber products.

2. Description of the Related Art

A glass fiber has been used in the past as a reinforcing material of rubber products such as a timing belt, a rubber hose, and so forth. Since such rubber products repeatedly receive a bending stress, bending fatigue occurs, so that peeling develops between the glass fiber as the reinforcing material and the rubber matrix, or the glass fiber is worn out and invites a drop in strength. Therefore, to bond the rubber and the glass fiber, an adhesive has been employed which comprises a mixed solution (VP-SBR type RFL) of vinylpyridine-styrene-butadiene rubber (VP-SBR) and a resorcin-formaldehyde resin.

However, because the heat resistance and water resistance of the VP-SBR type RFL adhesive are not sufficiently high, thermal degradation and peeling between the rubber and the glass fiber are likely to occur in those rubber products which are used at high temperature, such as a timing belt used in an engine. Further, because a material having a higher heat resistance such as hydrogenated nitrile rubber has been used as the rubber material, the bonding strength between the rubber and the glass fiber must be improved.

To solve such problems; Japanese Unexamined Patent Publication (Kokai) No. 4-41580 proposes a VP-SBR type RFL which blends a specific phenolic compound. When the glass fiber is processed by using the RFL disclosed in this reference, bonding can be attained with high heat resistance between the rubber and the glass fiber, and the bonding strength between the heat-resistant rubber and the glass fiber can be improved, as well.

However, the vinylpyridine-styrene-butadiene rubber itself used for this VP-SBR type RFL has a low heat resistance and in the RFL described above, too, the heat resistance is not very high. It may be possible, in principle, to use a hydrogenated nitrile-butadiene rubber (H-NBR) having high heat resistance and water resistance in place of this VP-SBR. The RFL (H-NBR type RFL) using this H-NBR has been used conventionally as an adhesive for organic fibers such as polyesters and aramides, and it is known that the RFL is excellent in heat resistance and the water resistance and hardly undergoes thermal degradation and swelling. Nonetheless, this H-NBR type RFL has low bonding strength, and the kinds of fibers to which it can be applied is limited. In other words, because the glass fiber per se is brittle, it cannot be subjected to the RFL processing after it is twisted, unlike organic fibers. It is therefore necessary to allow the fiber bundle to be impregnated with the RFL and to twist it only after drying and hardening. Here, the problem occurs in that twist is easily detwisted and the fiber bundle gets loose unless the RFL after drying has sufficient tackiness.

SUMMARY OF THE INVENTION

In the H-NBR type RFL having high heat resistance and water resistance described above, it is therefore an object of the present invention to provide an H-NBR type RFL which improves tackiness and which can be used as an adhesive between a rubber-reinforcing glass fiber and a rubber.

To accomplish the object described above, the present invention provides an adhesive characterized in that an ethyleneurea compound expressed by the following general formula is added to an H-NBR type RFL comprising a hydrogenated nitrile-butadiene rubber latex and resorcin-formaldehyde resin:

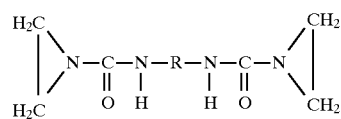

where R is a hydrocarbon group.

DESCRIPTION OF THE PREFERRED EMBODIMENTS

The hydrogenated nitrile-butadiene rubber latex used in the present invention is prepared by hydrogenating a conjugate diene unit of a copolymer of an unsaturated nitrile and a conjugate diene as the principal components and, whenever necessary, other copolymerisable monomers such as ethylenically unsaturated monomers. In other is words, examples of the rubber latex described above are those obtained by hydrogenating the conjugate diene unit of an unsaturated nitrile-conjugate diene copolymer rubber, by hydrogenating the conjugate diene unit of an unsaturated nitrile-conjugate diene-ethylenically unsaturated monomer copolymer rubber, and so forth. This hydrogenated nitrile-butadiene rubber latex can be produced by ordinary polymerisation methods and ordinary hydrogenation methods, and the methods are not particularly limitative.

The monomers used for producing this hydrogenated nitrile-butadiene rubber latex are the unsaturated nitrile, the conjugate diene and the ethylenically unsaturated monomers as described above, and concrete examples are given below.

Examples of the unsaturated nitrile include acrylonitrile and methacrylonitrile, and examples of the conjugate diene are 1,3-butadiene, 2,3-dimethylbutadiene, isoprene, 1,3-pentadiene, and the like. Examples of the ethylenically unsaturated monomers are unsaturated carboxylic acids (such as acrylic acid, methacrylic acid, itaconic acid and maleic acid), esters of the unsaturated carboxylic acids (such as methyl acrylate, ethyl acrylate, butyl acrylate, 2-ethylhexyl acrylate, etc.), alkoxyalkyl esters of the unsaturated carboxylic acids (such as methoxymethyl acrylate, ethoxyethyl acrylate, methoxyethoxyethyl acrylate, etc.), acryl amides, methacryl amides, N-substituted acryl amides or methacryl amides (such as N-methylol acrylamide, N,N'-dimethylol acrylamide).

The content of the unsaturated nitrile in this nitrile-butadiene rubber latex is not particularly limited but is preferably from 10 to 50 wt % from the aspect of tackiness of the resulting H-NBR type RFL. Concrete examples of the hydrogenated nitrile-butadiene rubber latex obtained by copolymerising the monomers described above are hydrogenated products of the following rubbers:

butadiene-acrylonitrile copolymer rubber, isoprene-butadiene-acrylonitrile copolymer rubber, butadiene-methyl acrylate-acrylonitrile copolymer rubber, butadiene-acrylic acid-acrylonitrile copolymer rubber, butadiene-ethylene-acrylonitrile copolymer rubber, butyl acrylate-ethoxyethyl acrylate-vinylchloro acetate-acrylonitrile copolymer rubber, butyl acrylate-ethoxyethyl acrylate-vinyl norbornane-acrylonitrile copolymer rubber, etc.

Known resins can be used as the resorcin-formaldehyde resin, and a resol type water-soluble resin prepared by reacting resorcin and formaldehyde by using an alkaline catalyst such as alkali hydroxide, amine, amnonia, etc., can be used, for example.

In the adhesive according to the present invention, 5.0 to 15.0 parts by weight of the resorcin-formaldehyde resin is generally added to 100 parts by weight of the hydrogenated nitrile-butadiene rubber latex. The ethyleneurea compound added to the H-NBR type RFL comprising these hydrogenated nitrile-butadiene rubber latex and resorcin-formaldehyde resin has the following general formula:

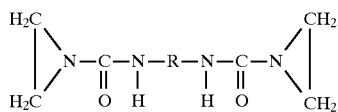

In the formula given above, R represents a hydrocarbon, which may be aromatic or aliphatic. Examples of R are expressed by the following formula:

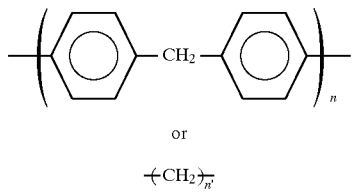

This ethyleneurea compound preferably has a low molecular weight to improve the tackiness thereof. It is believed that R in this ethyleneurea compound contributes to the heat resistance. When the carbon chain in R is long, the heat resistance drops. Therefore, the carbon chain of R is preferably short. Accordingly, n in the formula is preferably 1 and n' is preferably not greater than 6.

The addition amount of this ethyleneurea compound is preferably 0.6 to 8.0 wt % on the basis of the RFL solid content. When the addition amount of the ethyleneurea compound is smaller than 0.6 wt %, predetermined tackiness cannot be obtained and when it exceeds 8.0 wt %, on the other hand, a condensate occurs in the RFL solution and processing becomes difficult to practice.

EXAMPLE 1

First, 1.2 g of a 10% aqueous sodium hydroxide solution, and 4.5 g of resorcinol and 6.6 g of formalin (37% aqueous solution) were added and stirred. The solution was then allowed to react at 20° C. for 20 hours to provide an aqueous solution of a resorcin-formaldehyde resin. This aqueous solution, M-NBR latex (Zettpole 2020, 90% hydrogenated, solid content 40%, a product of Nippon Zeon K.K.), water and an ethyleneurea compound (FS50, solid content 27.5%, a product of Meisei Kagaku Kogyo K.K.; hereinafter called the "ethyleneurea compound 1") were added in the respective amounts tabulated in Table 1, were left standing at room temperature for 3 days, and were thereafter heat-treated to form films and to provide samples 1 to 8.

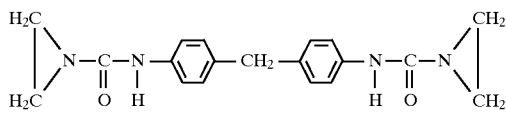

Similarly, film formation was carried out by using 5.9 g of an ethyleneurea compound (DM-130, solid content 20%; a product of Meisei Kasei Kogyo K.K.; hereinafter called the "ethyleneurea compound 2") to provide a sample 9. For comparison, the reaction was carried out in the same way for the system, to which the ethyleneurea compound was not added, to provide a sample 10. Further, a sample 11 was similarly obtained by using 20 g of VP-SBR latex (Nippol 2518GL, solid content 40%, a product of Nippon Zeon K.K.) in place of the H-NBR latex.

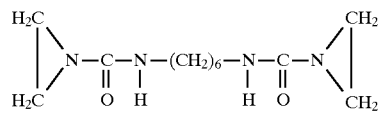

Degradation characteristics and tackiness of each film were measured for each of these samples in the following way.

(1) Degradation characteristics

Each of the resulting films (1.0 mm-thick) was cut into a predetermined size, and was left standing inside a furnace at 140° C. for 200 hours and in water at 95° C. for 100 hours, respectively, as a sample for measuring heat degradation characteristics and a sample for measuring water degradation characteristics. A tensile test was carried out in a customary manner by cutting out testpieces from these samples into a dumb-bell shape, and a tensile strength and an elastic modulus were measured for each of the samples of undegraded products, heat degraded products and water degraded products. A size change ratio was also measured for each sample by measuring the size change of the samples after heat degradation and water degradation with respect to the sizes before the degradation treatment.

(2) Tackiness

Two samples having a size of 1.5 cm×1.5 cm were cut out from each of the heat degraded samples and the water degraded samples described above. After the samples were bonded to flat sheet-like upper and lower compression jigs, they were left standing in an atmosphere of 120° C. for 10 minutes while the testpieces kept mutual contact and a load of 2 kgf was applied to them. Thereafter, the testpieces were peeled off at a rate of 1.0 mm/min, and the load at the time of this peeling was measured.

Table 2 illustrates the degradation characteristics and tackiness of the samples Nos. 1 to 11 so measured. By the way, the samples Nos. 1 to 6 and 9 are the Examples of the present invention and the samples Nos. 7, 8, 10 and 11 are the Comparative Examples.

TABLE 1

| Sample No. | 1 | 2 | 3 | 4 | 5 | 6 | 7 | 8 | 9 | 10 | 11 |
|---|---|---|---|---|---|---|---|---|---|---|---|
| RF condensation water | | | | | | | | | | | |
| resorcinol (powder) | 4.5 | 4.5 | 4.5 | 4.5 | 4.5 | 4.5 | 4.5 | 4.5 | 4.5 | 4.5 | 4.5 |
| formalin (37% aq. solution) | 6.6 | 6.6 | 6.6 | 6.6 | 6.6 | 6.6 | 6.6 | 6.6 | 6.6 | 6.6 | 6.6 |
| NaOH (10% aq. solution) | 1.2 | 1.2 | 1.2 | 1.2 | 1.2 | 1.2 | 1.2 | 1.2 | 1.2 | 1.2 | 1.2 |
| water | 95.5 | 95.5 | 95.5 | 95.5 | 95.5 | 95.5 | 95.5 | 95.5 | 95.5 | 95.5 | 95.5 |
| Latex | | | | | | | | | | | |
| H-NBR latex[1] | 200 | 200 | 200 | 200 | 150 | 250 | 200 | 200 | 200 | 200 | — |
| VP-SBR latex[2] | — | — | — | — | — | — | — | — | — | — | 200 |
| water | 75.0 | 75.0 | 75.0 | 75.0 | 56 | 94 | 75.0 | 75.0 | 75.0 | 75.0 | 75.0 |
| Ethyleneurea compound 1 | 5.0 | 2.0 | 10.0 | 27.0 | 3.7 | 5.8 | 1.5 | 30.0 | — | — | — |
| Ethyleneurea compound 2 | (1.5)[3] | (0.6) | (3.0) | (8) | (1.5) | (1.5) | (0.5) | (9) | 5.0 (1.1) | — | — |

[1]Zetpole 2020, product of Nippon Zeon K.K. (90% hydrogenated, solid content 40%)
[2]Nippole 2518GL, product of Nippon Zeon K.K. (solid content 40%)
[3]Solid content wt % on the basis of RFL solid content

TABLE 2

| | Deterioration characteristics | | | | | | | | | |
|---|---|---|---|---|---|---|---|---|---|---|
| | Tensile strength of RFL film (MPa) | | | Tensile elastic modulus of RFL film (MPa) | | | Dimensional change ratio of RFL film (%) | | | |
| | Undegraded product | Heat degraded product | Water degraded product | Undegraded product | Heat degraded product | Water degraded product | Undegraded product | Heat degraded product | Water degraded product | Tackiness (gr) |
| Sample 1 | 3.7 (100)[1] | 5.6 (151) | 4.5 (121) | 56 (100) | 57 (102) | 52 (93) | 0 | 1.8 | 0.8 | 388 |
| Sample 2 | 3.9 (100) | 5.9 (151) | 4.3 (110) | 63 (100) | 52 (83) | 48 (76) | 0 | 2.1 | 0.2 | 185 |
| Sample 3 | 3.4 (100) | 5.1 (150) | 4.9 (144) | 54 (100) | 55 (102) | 51 (93) | 0 | 1.6 | 0.9 | 381 |
| Sample 4 | 3.1 (100) | 4.8 (154) | 4.1 (132) | 38 (100) | 42 (111) | 31 (82) | 0 | 2.8 | 2.2 | 391 |
| Sample 5 | 2.6 (100) | 2.9 (112) | 2.8 (108) | 85 (100) | 85 (100) | 81 (95) | 0 | 1.3 | 0.2 | 164 |
| Sample 6 | 3.2 (100) | 3.7 (116) | 3.6 (113) | 51 (100) | 67 (131) | 41 (80) | 0 | 1.9 | 1.7 | 311 |
| Sample 7 | 3.6 (100) | 5.2 (151) | 4.5 (121) | 64 (100) | 60 (102) | 56 (88) | 0 | 1.5 | 0.5 | 115 |
| Sample 8 | — | — | — | — | — | — | — | — | — | — |
| Sample 9 | 3.1 (100) | 4.8 (154) | 4.1 (132) | 53 (100) | 61 (115) | 51 (96) | 0 | 2.1 | 0.7 | 346 |
| Sample 10 | 4.1 (100) | 5.4 (132) | 5.1 (124) | 74 (100) | 72 (97) | 51 (69) | 0 | 1.9 | 0 | 122 |
| Sample 11 | 2.9 (100) | 4.3 (148) | 2.4 (83) | 62 (100) | 108 (174) | 32 (52) | 0 | 2.4 | 7.1 | 377 |

[1]proportion to undegraded product (%)

In Sample No. 8, the RFL solution aggregated and the film could not be formed. As to the degradation characteristics, the Samples Nos. 1 to 6 and 9 comprising mainly the H-NBR latex exhibited far better degradation resistance characteristics than the Sample No. 11 comprising mainly the VP-SBR latex. In other words, the increase of the elastic modulus and the increase of the heat shrinkage ratio due to degradation resulted in the increase of the heat shrinkage stress, and breakage of the adhesive applied to the glass fiber started occurring at the point exceeding the strength. A large water swelling ratio and a large dimensional change resulted in the changes of the structure and size of the core wires as the reinforcing material in the rubber product and affected the mechanical characteristics. Further, they meant easy water permeation of the adhesive and the supply of water to the silane coupling agent existing in the interface between the glass fiber and the adhesive, and there was the possibility of hydrolysis of the silane coupling agent with the result being the peeling of the adhesive from the glass fiber. The breakage and peeling of the treating agent was promoted by the dynamic stress during the use of the rubber product.

As to the tackiness, on the other hand, its effect could not be obtained when the addition amount of the ethyleneurea compound was 0.5 wt % as was in Sample 7, and the tackiness exhibition effect could be expected with the increase of the addition amount of the ethyleneurea compound. When the addition amount was 1.5 wt % as in the Sample No. 1, the tackiness was equivalent to that of the Sample No. 11 comprising mainly the VP-SBR latex. However, the tackiness did not much increase even when the addition amount of the ethyleneurea compound was increased to 3.0 wt %.

As explained above, when the hydrogenated nitrile-butadiene rubber is used as the adhesive for bonding rubber and glass fiber, the heat resistance and the water resisting property of the resulting composite rubber product can be improved, and the tackiness of this adhesive can be improved by adding an ethyleneurea compound to this adhesive.

I claim:

1. An adhesive for bonding a rubber and a glass fiber, comprising:

(1) a hydrogenated nitrile-butadiene rubber latex;

(2) a resorcin-formaldehyde resin; and (3) an ethyleneurea compound expressed by the following general formula:

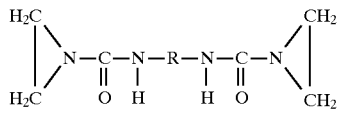

where R is a hydrocarbon group.

2. An adhesive according to claim 1, wherein the solid content of said ethyleneurea compound is 0.6 to 8.0 wt % on the basis of said hydrogenated nitrile-butadiene rubber latex and said resorcin-formaldehyde resin.

3. An adhesive according to claim 1, wherein 5.0 to 15.0 parts by weight of said resorcin-formaldehyde resin is blended per 100 parts by weight of said hydrogenated nitrile-butadiene rubber latex.

4. An adhesive according to claim 1, wherein R is expressed by the following formula:

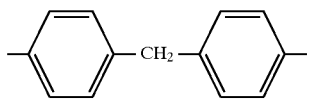

5. An adhesive according to claim 1, wherein R is expressed by the following formula:

$$-(CH_2)_{n'}-$$

where n' is 1 to 6.

6. An adhesive for bonding a rubber and a glass fiber consisting essentially of:

(1) a hydrogenated nitrile-butadiene rubber latex;

(2) a resorcin-formaldehyde resin; and (3) an ethyleneurea compound expressed by the following general formula:

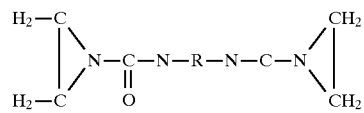

where R is a hydrocarbon group.

7. An adhesive according to claim 6, wherein the solid content of said ethyleneurea compound is 0.6 to 8.0 wt. % on the basis of said hydrogenated nitrile-butadiene rubber latex and said resorcin-formaldehyde resin.

8. An adhesive according to claim 6, wherein 5.0 to 15.0 parts by weight of said resorcin-formaldehyde resin is blended per 100 parts by weight of said hydrogenated nitrile-butadiene rubber latex.

9. An adhesive according to claim 6, wherein R is expressed by the following formula:

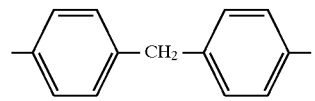

10. An adhesive according to claim 6, wherein R is expressed by the following formula:

$$-(CH_2)_{n'}-$$

where n' is 1 to 6.

* * * * *